(12) United States Patent
Jose et al.

(10) Patent No.: US 9,864,974 B2
(45) Date of Patent: Jan. 9, 2018

(54) SERENDIPITOUS ISSUE REMINDER SYSTEM

(71) Applicant: Microsoft Technology Licensing, LLC, Redmond, WA (US)

(72) Inventors: Rinaldo Jose, San Jose, CA (US); Tomer Cohen, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/931,542

(22) Filed: Jun. 28, 2013

(65) Prior Publication Data

US 2015/0006219 A1 Jan. 1, 2015

(51) Int. Cl.
*G06Q 10/00* (2012.01)
*G06Q 10/10* (2012.01)

(52) U.S. Cl.
CPC ................ *G06Q 10/1095* (2013.01)

(58) Field of Classification Search
CPC ................................ G06Q 10/1095
USPC ........................................ 705/7.19
See application file for complete search history.

(56) References Cited

U.S. PATENT DOCUMENTS

| | | | |
|---|---|---|---|
| 8,005,703 B2* | 8/2011 | Chakra et al. | 705/7.19 |
| 2006/0224430 A1* | 10/2006 | Butt | 705/8 |
| 2007/0167136 A1* | 7/2007 | Groth | 455/41.2 |
| 2009/0089133 A1* | 4/2009 | Johnson et al. | 705/9 |
| 2009/0106059 A1* | 4/2009 | Megiddo et al. | 705/7 |
| 2009/0225971 A1* | 9/2009 | Miller et al. | 379/202.01 |
| 2010/0211425 A1* | 8/2010 | Govindarajan | 705/8 |
| 2010/0223341 A1* | 9/2010 | Manolescu et al. | 709/206 |
| 2010/0223581 A1* | 9/2010 | Manolescu et al. | 715/853 |
| 2011/0231409 A1* | 9/2011 | Dhara et al. | 707/748 |
| 2012/0179981 A1* | 7/2012 | Whalin et al. | 715/753 |
| 2014/0025734 A1* | 1/2014 | Griffin | 709/204 |
| 2014/0200949 A1* | 7/2014 | Perry et al. | 705/7.26 |

* cited by examiner

*Primary Examiner* — Sujay Koneru
(74) *Attorney, Agent, or Firm* — Schwegman Lundberg & Woessner, P.A.

(57) ABSTRACT

A method of arranging a serendipitous meeting is disclosed. It is determined that a first person of an organization is within a physical proximity to a second person of the organization. A discussion topic is identified, the discussion topic being relevant to a first task pertaining to the organization and a second task pertaining to the organization, the first task being associated with the first person and the second task being associated with the second person. At least one of the first person and the second person is notified of the identifying of the discussion topic while the first person is within the physical proximity to the second person.

14 Claims, 7 Drawing Sheets

SERENDIPITOUS ISSUE REMINDER SYSTEM

TECHNICAL FIELD

This application relates generally to the technical field of social networking, and, in one specific example, to proposing an impromptu meeting between people of an organization who are physically proximate to one another.

BACKGROUND

Meeting management software (e.g., Microsoft Outlook or Google Calendar) may require a person (e.g., a meeting planner) to enter details about a meeting, invite people to the meeting, reserve a location (e.g., a conference room) for the meeting, and perform other meeting management tasks. Thus, setting up a meeting between members of an organization using tools of the organization may typically involve significant up-front manual input from meeting planners or participants.

BRIEF DESCRIPTION OF THE DRAWINGS

Some embodiments are illustrated by way of example and not limitation in the figures of the accompanying drawings in which.

DETAILED DESCRIPTION

Figure 1:
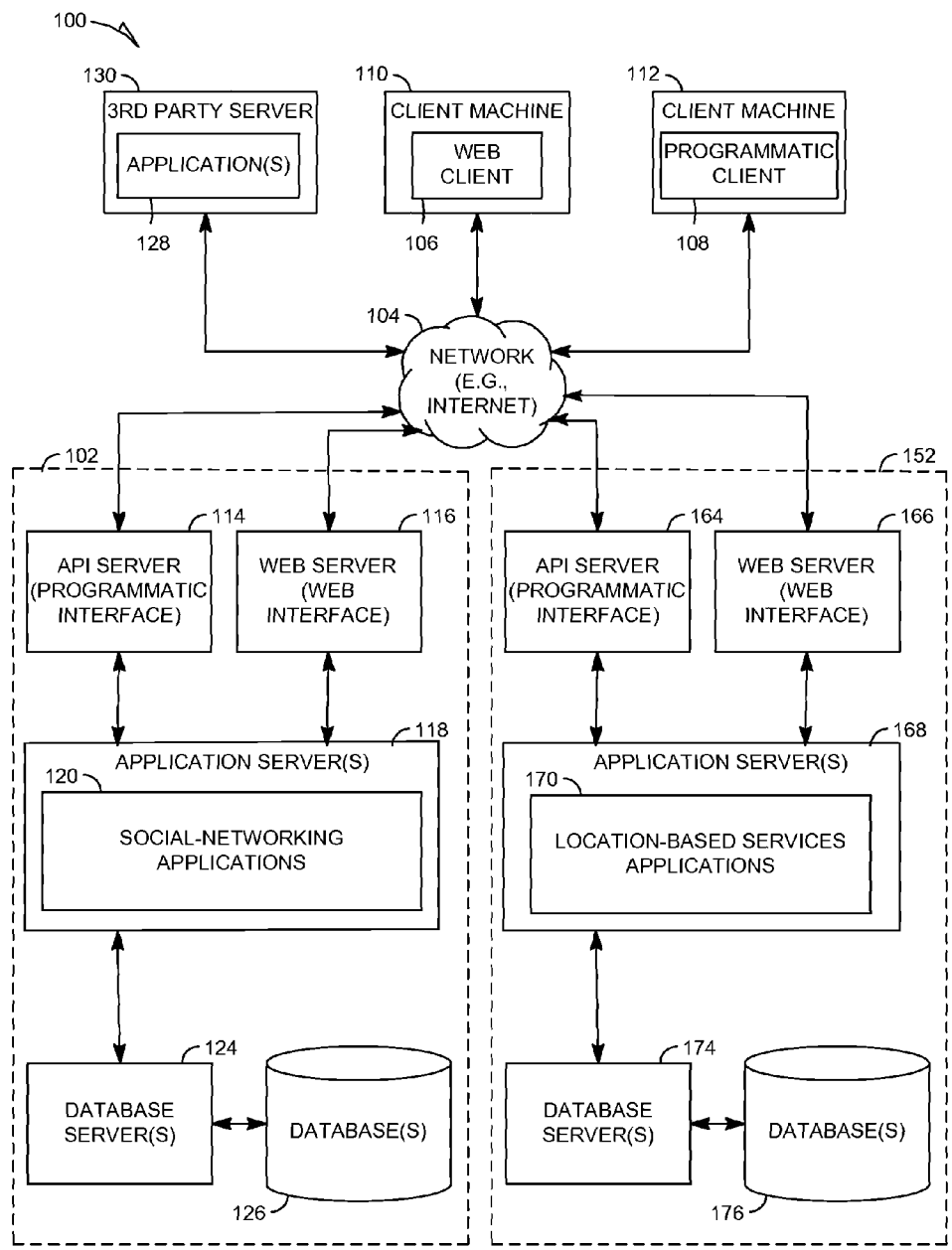
FIG. 1 is a network diagram depicting a client-server system within which various example embodiments may be deployed.

In the following description, for purposes of explanation, numerous specific details are set forth in order to provide an understanding of various embodiments of the inventive subject matter. It will be evident, however, to those skilled in the art that embodiments may be practiced without these specific details. Further, to avoid obscuring the inventive concepts in unnecessary detail, well-known instruction instances, protocols, structures, and techniques have not been shown in detail. As used herein, the term "or" may be construed in an inclusive or exclusive sense, the term "user" may be construed to include a person or a machine, and the term "interface" may be construed to include an application program interface (API) or a user interface.

A group of two or more members of an organization, in going about their normal or scheduled routines, for example, may pass each other in the halls of a workplace building, see each other in a workplace cafeteria, or otherwise be physically proximate to one another during a time period without realizing that a meeting between them during that time period (e.g., to discuss a particular topic or make a particular decision) would benefit themselves or the organization.

A serendipitous issue reminder system, which may be embodied as a software application (e.g., a native application or a Java application executing on a mobile device of a person who is a member of the organization or a server in communication with an application (e.g., a web browser) executing on the device), may be configured to perform various operations to arrange a serendipitous meeting between two or more people.

In various embodiments, the issue reminder system may determine that two or more people are physically proximate to one another. For example, the issue reminder system may detect physical proximity between the two or more people based on communications with a location-based services system. In various embodiments, the issue reminder system may determine that the two or more people have a relationship to one another (e.g., that the two people are members of an organization, attendees of a conference, friends with respect to a social networking system, and so on).

The issue reminder system may further determine that there are one or more issues relevant to the two or more people that they may wish to discuss or resolve while they are physically proximate to one another. For example, the issue reminder system may access systems storing data pertaining to the two or more people, such as communication systems (e.g., email, instant messaging, or other communication systems), project management systems (e.g., Microsoft Project or other task-management systems), bug tracking systems, electronic forum or chat systems, and so on, to determine the relevant issues.

The issue reminder system may then propose a serendipitous meeting between the two or more people (e.g., by sending a notification to a mobile device of each of the two or more people). That is, the issue reminder system may propose a meeting that was not planned or sought after by the two or more people. The meeting proposal may include the issue as a proposed agenda item for the meeting. Upon receiving the notification, the two or more people may indicate an acceptance or rejection of the meeting proposal. If the meeting is accepted, the issue reminder system may store information generated during the meeting (e.g., action items or decisions made) for later access by the meeting participants or to others who are granted access to the information.

In various embodiments, a method of arranging a serendipitous meeting is disclosed. It is determined that a first person of an organization is within a physical proximity to a second person of the organization. A discussion topic is identified, the discussion topic being relevant to a first task pertaining to the organization and a second task pertaining to the organization, the first task being associated with the first person and the second task being associated with the second person. At least one of the first person and the second person is notified of the identifying of the discussion topic while the first person is within the physical proximity to the second person.

This method and other methods or embodiments disclosed herein may be implemented as a computer system having one or more modules (e.g., hardware modules or software modules). Such modules may be executed by one or more processors of the computer system. This method and other methods or embodiments disclosed herein may be embodied as instructions stored on a machine-readable medium that, when executed by one or more processors, cause the one or more processors to perform the instructions.

FIG. 1 is a network diagram depicting a client-server system 100 within which various example embodiments may be deployed. A networked system 102, in the example forms of a social-networking system or other communication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash.) and a programmatic client 108 executing on respective client machines 110 and 112. Each of the one or more clients 106, 108 may include a software application module (e.g., a plug-in, add-in, or macro) that adds a specific service or feature to a larger system.

Within the networked system 102, an API server 114 and a web server 116 are coupled to, and provide programmatic and web interfaces respectively to, one or more application servers 118. The application servers 118 host one or more social-networking application(s) 120. The application servers 118 are, in turn, shown to be coupled to one or more databases servers 124 that facilitate access to one or more databases or NoSQL or non-relational data stores 126.

An additional networked system 152, in the example forms of a location-based services system or other communication system, provides server-side functionality, via a network 104 to the one or more clients.

Within the networked system 152, an API server 164 and a web server 166 are coupled to, and provide programmatic and web interfaces respectively to, one or more application servers 168. The application servers 168 host one or more applications (e.g., location-based services application(s) 170). The application servers 168 are, in turn, shown to be coupled to one or more databases servers 174 that facilitate access to one or more databases or NoSQL or non-relational data stores 176. In various embodiments, the location-based services application(s) 170 are configured to receive information on the geographical position of a mobile device. Thus, for example, the location-based services applications may receive and transmit data pertaining to the location of a user carrying a mobile device during a commute of the user from a first location to a second location. A mobile device may be any device that is capable of being carried around. Examples of mobile devices may include a laptop computer, a tablet computer (e.g., an iPad), a mobile or smart phone (e.g., an iPhone), a smart watch (e.g., a Pebble E-Paper Watch), an augmented reality head-mounted display (e.g., Google Glass), and so on.

The applications 120 and 170 may provide a number of functions and services to users who access the networked systems 102 and 152. While the applications are shown in FIG. 1 to form part of the networked systems 102 and 152, in alternative embodiments, the applications may form part of a service that is separate and distinct from the networked systems 102 and 152.

Further, while the system 100 shown in FIG. 1 employs a client-server architecture, various embodiments are, of course, not limited to such an architecture, and could equally well find application in a distributed, or peer-to-peer, architecture system, for example. The various applications could also be implemented as standalone software programs, which do not necessarily have computer networking capabilities. Additionally, although FIG. 1 depicts machines 130, 110, and 112 as being coupled to a networked system 102 and networked system 152, it will be readily apparent to one skilled in the art that machines 130, 110, and 112, as well as client 128, 106, and 108, may be coupled to multiple additional networked systems. For example, the clients 128, 106, and 108 may be coupled to multiple applications, such as applications 120 and 170.

The web client 106 accesses the various applications 120 and 170 via the web interface supported by the web server 116 or the web server 166 respectively. Similarly, the programmatic client 108 accesses the various services and functions provided by the applications 120 and 170 via the programmatic interface provided by the API server 114 and API server 164, respectively. The programmatic client 108 may, for example, perform batch-mode communications between the programmatic client 108 and the networked systems 102 and 152.

FIG. 1 also illustrates a third party application 128, executing on a third party server machine 130, as having programmatic access to the networked systems 102 and 152 via the programmatic interface provided by the API server 114 and the API server 164, respectively. For example, the third party application 128 may, utilizing information retrieved from the networked systems 102 and 152, support one or more features or functions on a website hosted by the third party. The third party website may, for example, provide one or more social-networking functions that are supported by the relevant applications of the networked system 102.

Figure 2:
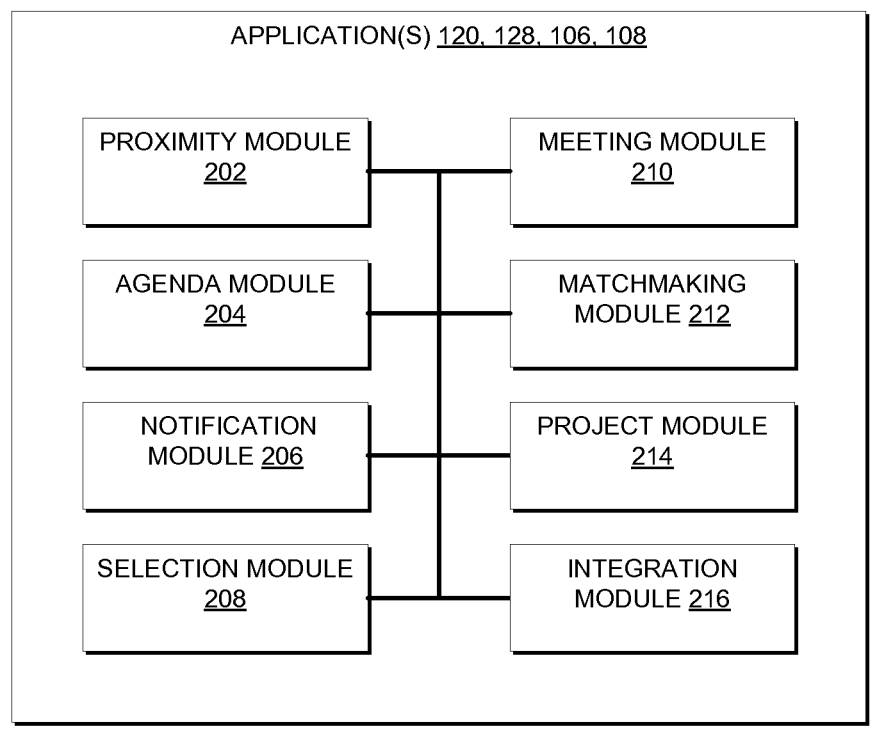
FIG. 2 is a block diagram illustrating example modules of the application(s) of FIG. 1.

FIG. 2 is a block diagram illustrating example modules of the application(s) 106, 108, 120, or 128 of FIG. 1. A proximity module 202 may be configured to determine relative physical locations of people or things. For example, the proximity module 202 may determine that a first person is within a physical proximity to a second person (e.g., that a first person is within 10 feet of a second person). The proximity module 202 may determine relative physical proximities based on communication with the location-based services application(s) 170. Or the proximity module 202 may determine relative physical proximities based on communication with devices (e.g., iPhones, tablets, wearable computing devices, and so on carried by a person). Or the proximity module 202 may determine relative physical proximities based on check-ins of the users at locations (e.g., explicit specifications by the users that they are at specific locations at specific times). Or the proximity module 202 may determine relative physical proximities based on near-field communication between devices. For example, the physical proximity module 202 may be at least partially distributed onto devices and configured to perform near-field communication to determine relative physical locations of individuals possessing the devices.

An agenda module 204 may be configured to determine agenda items for a serendipitous meeting between two or more people. The agenda module 204 may determine the agenda items based on an analysis of data pertaining to the two or more people (e.g., data from profiles of the people maintained by the people on a social networking system, data about behavior of the people with respect to the social networking system, data from project management systems or bug tracking systems of an organization, and so on). For example, the agenda module 204 may determine an agenda item for a serendipitous meeting between two people of an organization based on data about projects and tasks to which the two people are assigned, an importance of the tasks to the organization, and so on, as will be described in more detail below.

A notification module 206 may be configured to notify at least one of the two or more people of a proposed serendipitous meeting between the two or more people. The notification may include a proposed agenda item for the meeting, a proposed length of time for the meeting (e.g., based on an amount of time that each of the two or more people is available), and so on, as will be described in more detail below.

A selection module 208 may be configured to select an agenda item, discussion topic, or decision action from a plurality of agenda items, discussion topics, or decision actions, respectively. For example, the selection module 208 may select a discussion topic based on an importance of the discussion topic to the organization or a relevance of the discussion topic to proposed attendees of the serendipitous meeting.

A meeting module 210 may be configured to coordinate the meeting. For example, the meeting module 210 may be in communication with a meeting organization platform, such as Microsoft Outlook or Google Calendar, and may automatically schedule the meeting within the meeting organization platform. The meeting module 210 may include the Virtual Conference Manager described in U.S. patent application Ser. No. 13/931,194, which is herein incorporated by reference in its entirety.

A matchmaking module 212 may be configured to manage matchmaking of people for serendipitous meetings. For example, the matchmaking module 212 may determine that a first person may be interested in engaging in a serendipitous meeting with a second person. The matchmaking module 212 may then propose the serendipitous meeting to the second person.

A project module 214 may be configured to analyze projects (e.g., after completion) to determine how project management may be improved in the future. In various embodiments, findings of the project module 214 may be used as a factor in determining relevance of agenda items.

An integration module 216 may be configured to integrate notes, to-do-items, voice-to-text, decisions, or other data collected from serendipitous meetings into project management systems, calendaring systems, or other systems of the organization. For example, the integration module 216 may merge notes collected from a serendipitous meeting into notes collected at a regular meeting pertaining to an agenda item that is shared between the meetings. Thus, participants of either meeting may have access to a complete record of meetings pertaining to the agenda item. The data gathered from serendipitous meetings may be consolidated with data gathered from regular meetings or data gathered from other systems and stored in a cloud that is accessible from various devices of members of the organization via the integration module 216.

In various embodiments one or more of the modules 202-216 or portions of the modules 202-216 may be included in server applications 120 or in a client, such as the 3rd party application 128, web client 106, or programmatic client 108 of FIG. 1. In other words, the modules may be distributed among the servers and clients such that some or all of the functionality is provided on the server side or some or all of the functionality is provided on the client side. For example, the notification module may be distributed such that a portion of the notification module is implemented on the client side (e.g., for presenting notifications to the user in a user interface of the device) and a portion of the transmission module is implemented on the server side (e.g., for transmitting notifications to the client device from the server).

Figure 3:
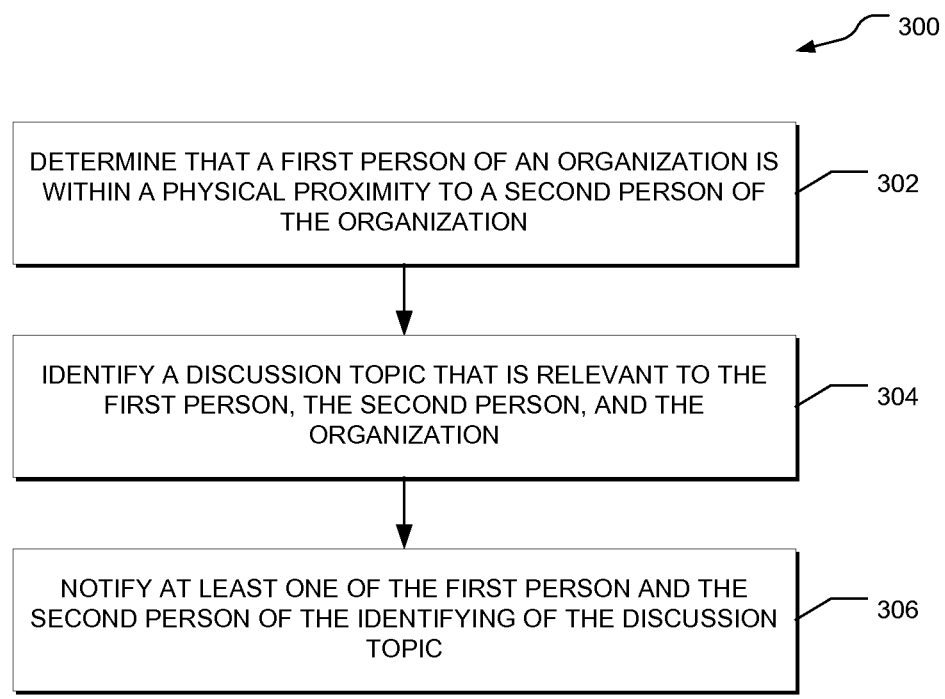
FIG. 3 is a flow chart illustrating example operations of a method of notifying at least one of a first person and a second person of a relevant discussion topic.

FIG. 3 is a flow chart illustrating example operations of a method 300 of notifying at least one of a first person and a second person of a relevant discussion topic. In various embodiments, the method 300 may be implemented by the modules 202-216 of FIG. 2.

At operation 302, the proximity module 202 determines that a first person of an organization is within a physical proximity to a second person of the organization. For example, the proximity module 202 determines that Joe, who is employed by XYZ corporation, is within 5 feet of Fred, who is also employed by XYZ corporation. In various embodiments, the proximity module 202 may determine that the first person and the second person are members of the same organization based on information maintained in profiles of the first person and the second person on a social networking system. Or the relationship between the first person and the second person may be determined based on public data accessed by the proximity module 202. Or the relationship between the first person and the second person may be determined based on their membership in a public or private group established within the social networking system that pertains to the organization.

At operation 304, the agenda module 204 identifies a discussion topic that is relevant to the first person, the second person, and the organization. For example, the agenda module 204 may determine that Joe and Fred are working on separate tasks of a project having importance to the organization. The importance of the discussion topic to the organization may be based on a determination that recent communications between people of the organization have focused on the project. For example, the agenda module 204 may mine databases of the organization, such as email, instant message, bug tracking, message board, project management, meeting management, or other systems, to determine a level of importance of projects, tasks, decisions-to-be-made, and so on. The agenda module 204 may determine the importance of a discussion topic based on a bell-curve of the frequency of communications pertaining to the discussion topic over time. If the number of communications pertaining to the discussion topic over time is increasing with respect to an individual or the organization, the discussion topic may be deemed as particularly relevant. In contrast, if the number of communication pertaining to the discussion topic over time is decreasing, the discussion topic may not be deemed to be relevant.

In various embodiments, the agenda module 204 determines a relevancy score to associate with the discussion topic. If the relevancy score transgresses a relevancy threshold, the relevancy score may be deemed to be sufficiently relevant. In various embodiments, a different relevancy score of a discussion topic may be determined for each of the first person, the second person, and the organization. For example, a discussion topic that is particularly relevant to the first person may not be particularly relevant to the second person or the organization. In various embodiments, the agenda module 204 identifies the relevancy of a discussion topic based on the aggregate relevancy scores of the discussion topic in relation to the first person, the second person, and the organization. In various embodiments, the agenda module 204 identifies the relevancy of the discussion based on the relevancy of the discussion topic to the organization irrespective of the relevancy of the discussion topic to the first person, the second person, or both people.

For example, the agenda module 204 may determine that a particular project is of particular importance to the organization. The agenda module 204 may also determine that the first person is working on a task that is related to the project and that the second person, although not working on a task that is related to the project, has been involved in discussions pertaining to a particular aspect of the project. In various embodiments, the agenda module 204 may select the particular aspect of the project as a discussion topic that as being sufficiently relevant to the first person, second person, and the organization that at least one of the first person and the second person should be notified of the identification of the discussion topic.

In various embodiments, the agenda module 204 may identify two or more topics that are of particular relevance. In various embodiments, the agenda module 204 may sort the identified topics by their relevance scores for presentation to at least one of the first person and the second person.

The relevancy and importance determinations made by the agenda module 204 may be based on offline analysis of data gathered by the agenda module 204. The agenda module 204 may use open-source software, such as Apache Hadoop and Neo4j, to perform the analysis.

At operation 306, the notification module 206 notifies at least one of the first person and the second person of the identifying of the discussion topic (e.g., based on an identification of a discussion topic that is relevant). For example, the notification module 206 may generate and send a text message to a mobile device of the first person. In various embodiments, the text message may be generated to include information about the second person, the relevance of the discussion topic, an amount of time that each person may have available to discuss the topic, the location of the second person, and so on.

Thus, as an example, both the first person and the second person may be waiting outside of a conference room for a meeting that is to begin in 15 minutes. The first person or the second person may be notified that they are working on tasks pertaining to a project that has particular importance to the organization and that it may be helpful to first person, the second person, or to the organization, for the first person and the second person to discuss a topic pertaining to the project, such as the status of a particular task of the project. In response, the first person and the second person may choose to engage in a serendipitous meeting to discuss the topic based on their presence outside the meeting room and the allotted time before the start of the planned meeting.

In various embodiments, an algorithm may be applied to determine which of the various parties should receive the notification (e.g., and thus be responsible for initiating the serendipitous meeting with one or more additional party). For example, the notification module 206 may notify a most senior member of the parties (e.g., an individual having the highest rank within the organization) to initiate the meeting. Or the notification module 206 may select a first individual to initiate a meeting with a second individual based on the first individual being more senior (e.g., with respect to a job title, education level, and so on) than the second individual and also having a confirmed relationship with the second individual with respect to the social networking system. On the other hand, the notification module 206 may select a first person to initiate the meeting based on the first person being more junior than the second person and the first person not having a confirmed relationship with the second individual with respect to the social networking system. Thus, any data pertaining to an individual that is collected (e.g., from a profile of the individual or from other sources) may be used as input for determining which of multiple parties that are selected as candidates for a serendipitous meeting is responsible for forming, initiating, or otherwise managing the serendipitous meeting.

In various embodiments, the meeting module 210 manages the serendipitous meeting by capturing notes, voice-to-text, and to-do items from the meeting.

Figure 4:
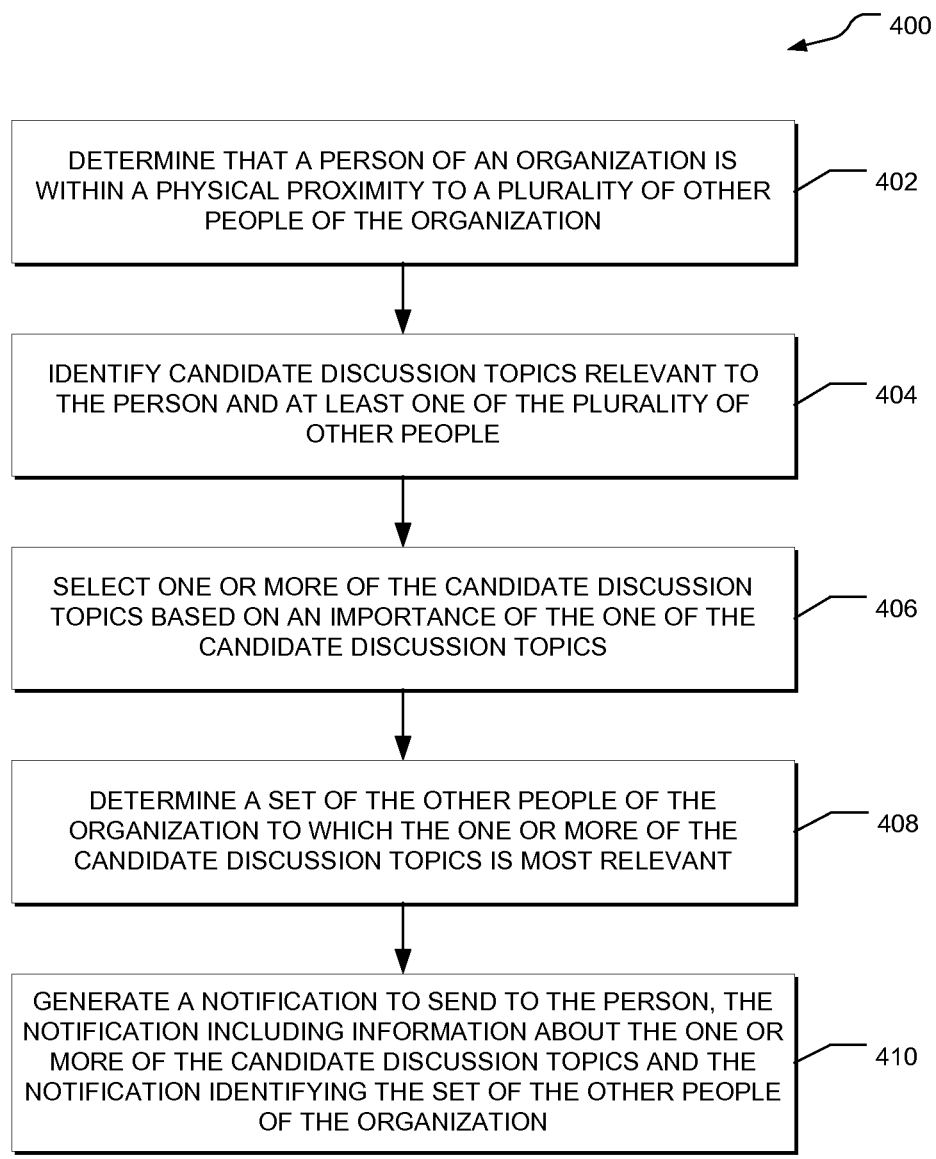
FIG. 4 is a flow chart illustrating example operations of a method of generating a notification of candidate discussion topics and parties to which the discussion topics may be relevant.

FIG. 4 is a flow chart illustrating example operations of a method 400 of generating a notification of candidate discussion topics and parties to which the discussion topics may be relevant. In various embodiments, the method 400 may be implemented by the modules 202-216 of FIG. 2.

At operation 402, the proximity module 202 determines that a person of an organization is within a physical proximity to a plurality of other people of the organization.

At operation 404, the agenda module 204 identifies candidate discussion topics relevant to the person and at least one of the plurality of other people.

At operation 406, the agenda module selects one or more of the candidate discussion topics based on an importance of the one or more of the candidate discussion topics.

At operation 408, the agenda module determines a set of the other people of the organization to which the one or more of the candidate discussion topics is most relevant.

At operation 410, the notification module 206 generates a notification to send to the person, the notification including information about the one or more of the candidate discussion topics and the notification identifying the set of other people of the organization.

For example, the proximity module 202 may detect that a person is in cafeteria of the organization. Based on the presence of other people in the vicinity of the person, the agenda module 204 may identify one or more discussion topics that may be suited for a lunch time conversation between the person and a set of the other people in the vicinity of the person. The notification module 206 may generate a notification to the person of the identification of the one or more discussion topics and the set of other people to which the topics are most relevant.

Figure 5:
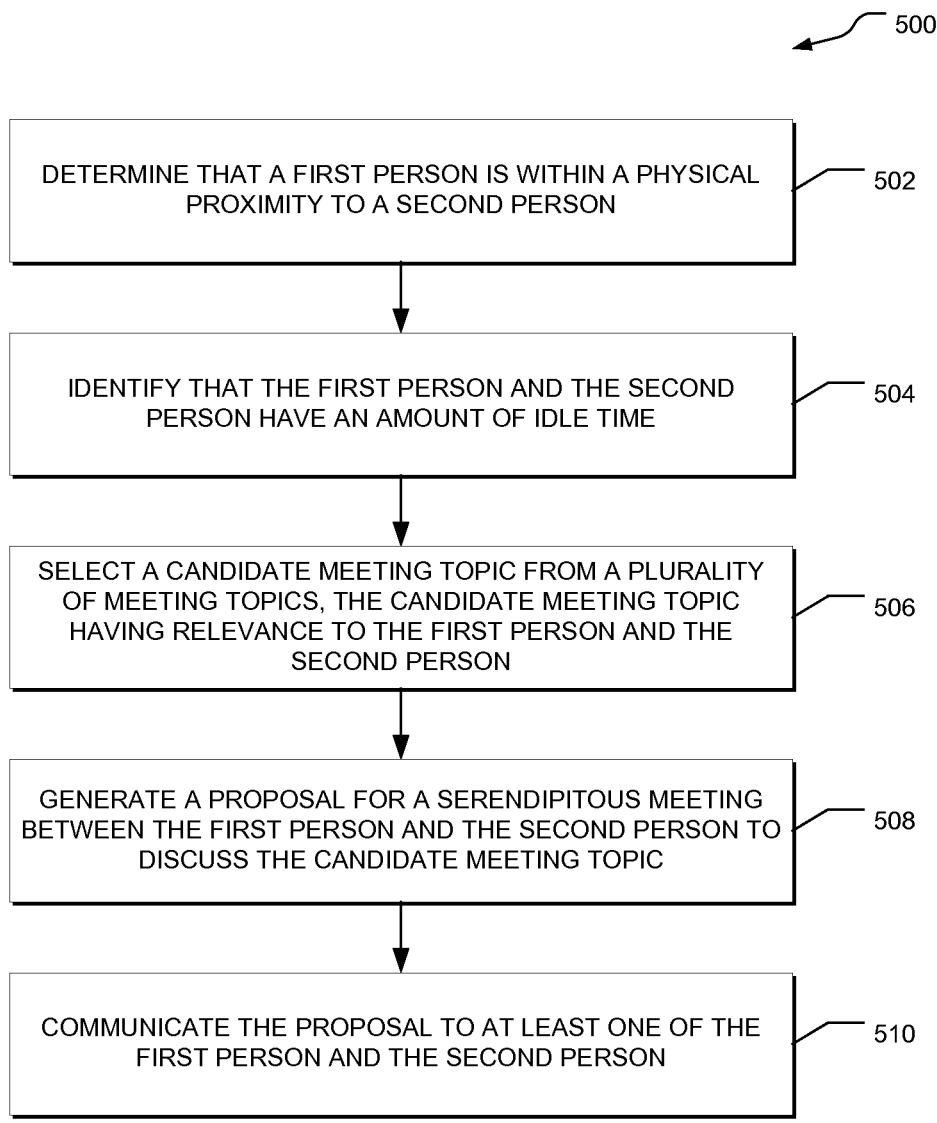
FIG. 5 is a flow chart illustrating example operations of a method of communicating a proposal for a serendipitous meeting between a first person and a second person.

FIG. 5 is a flow chart illustrating example operations of a method 500 of communicating a proposal for a serendipitous meeting between a first person and a second person. In various embodiments, the method 500 may be implemented by the modules 202-216 of FIG. 2.

At operation 502, the proximity module 202 may determine that a first person is within a physical proximity to a second person.

At operation 504, the agenda module 204 may identify that the first person and the second person have an amount of idle time. For example, the agenda module 204 may identify that the first person and the second person are waiting outside of a conference room for a meeting that is to begin in 15 minutes.

At operation 506, the selection module 208 may select a candidate meeting topic from a plurality of candidate meetings topics. The meeting topic may be selected based on a relevance of the meeting topic to the first person, the second person, or an organization with which the first person and the second person are associated, as described above.

At operation 508, the meeting module 210 may generate a proposal for a serendipitous meeting between the first person and the second person to discuss the agenda item. For example, the meeting module 210 may generate a meeting invitation (e.g., within Microsoft Outlook or Google Calendar) for an impromptu meeting between the first person and the second person at the current location and time.

At operation 510, the notification module 206 may communicate the proposal to at least one of the first person and the second person.

Figure 6:
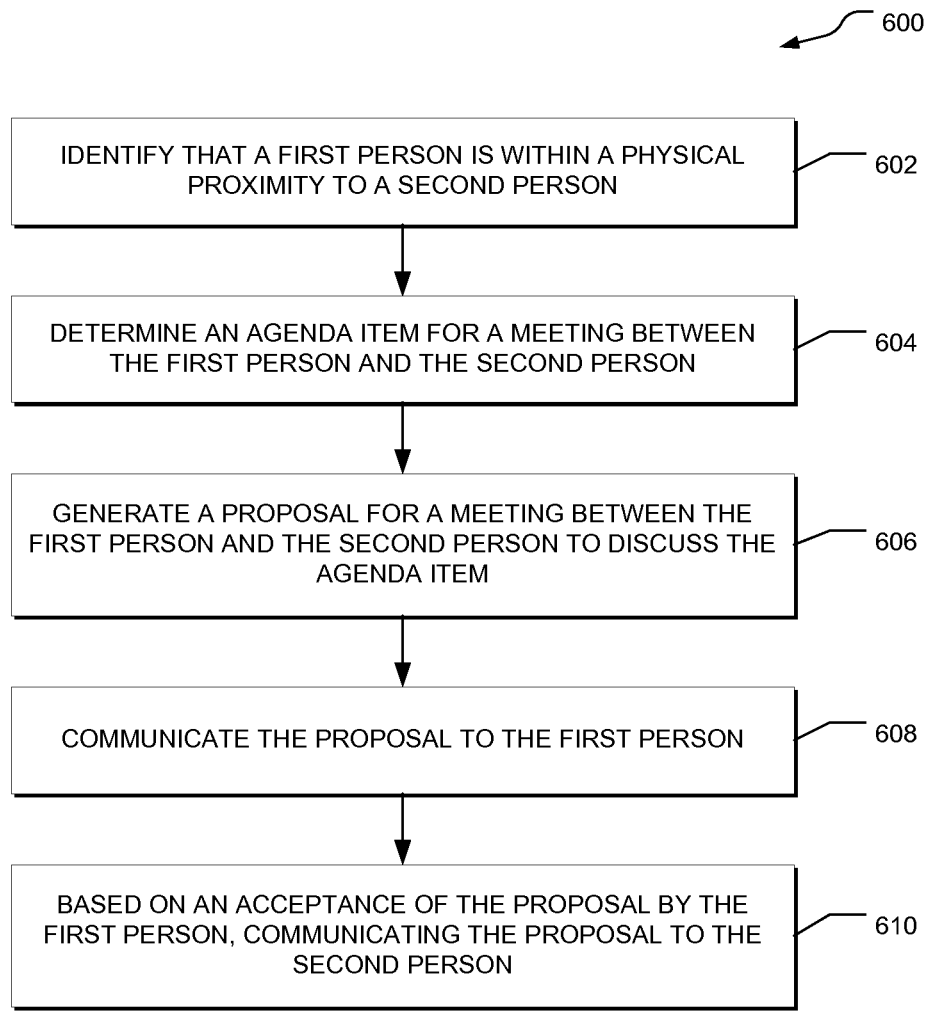
FIG. 6 is a flow chart illustrating example operations of a method of communicating a proposal for a serendipitous meeting to a second person based on an acceptance of the proposal by a first person.

FIG. 6 is a flow chart illustrating example operations of a method 600 of communicating a proposal for a serendipitous meeting to a second person based on an acceptance of the proposal by a first person. In various embodiments, the method 600 may be implemented by the modules 202-216 of FIG. 2.

At operation 602, the proximity module 202 may identify that a first person is within a physical proximity to a second person.

At operation 604, the agenda module 204 may determine an agenda item for a meeting between the first person and the second person.

At operation 606, the agenda module may generate a proposal for a meeting between the first person and the second person to discuss the agenda item.

At operation 608, the notification module 206 may communicate the proposal to the first person.

At operation 610, based on the acceptance of the proposal by the first person, the notification module 206 may communicate the proposal to the second person. Thus, the second person may not be notified of the proposal for the meeting unless the first person accepts the proposal.

In various embodiments, as described above, the agenda module 204 may mine various databases for communications between individuals to determine candidate agenda items. For example, the agenda module 204 may analyze email communications between people of an organization between members of an organization to identify tasks that have been assigned to individuals. For example, the agenda module 204 may determine that a particular person is associated with a particular task based on an email message in which a manager of the individual asked the individual to perform the task. Or the agenda module 204 may determine that a particular person is associated with a particular project or task based on an explicit assignment of the task to the person in a project management system (e.g., Microsoft Project) or bug tracking system. Or the agenda module 204 may determine that a particular project or task is associated with particular individuals based on email addresses of individuals being included on the To or Cc line of email messages sent between the individuals pertaining to the project or task.

In various embodiments, the agenda module 204 may identify a discussion topic pertaining to a particular task based on a determination that the person to which the task has been assigned has not started the task, updated his status on the task, or completed the task within associated deadlines. For example, if a manager of an individual is walking down a hallway of the headquarters of an organization, that manager may be notified as he passes the individual in the hallway that the individual is behind in his completion of a task to which he has been assigned. This notification may be presented as an agenda item for a proposed serendipitous meeting between the manager and the individual.

As another example, if a manager is within proximity of several individuals who are behind on various tasks, the manager may only be presented with a proposal for a serendipitous meeting for a task assigned to one or a subset of the individuals. This proposal may be selected based on a determination that the task to which the one or the subset of the individuals are assigned has the most importance to the organization (e.g., based on an analysis of communications between people of the organization), to the manager, to the individuals, or any combination of relevancy scores.

As another example, if an employee is within a proximity to his manager, the employee may be notified of one or more topics that may be of importance to address with his manager (e.g., a status of a project).

In various embodiments, the agenda module 204 taps into the information in a social network of the individuals, such as LinkedIn, to determine relationships between individuals, projects, tasks, and so on. The agenda module 204 may determine agenda items and relevance of the agenda items to particular individuals based on information specified in the profiles of the individuals on the social network or behaviors of the users with respect to the social network.

In various embodiments, the project module 214 analyzes patterns in project life cycles to identify agenda items that may make future projects run more smoothly. For example, the project module 214 may identify that tasks were not efficiently allocated to individuals within the organization or that the tasks assigned to particular individuals were completed behind schedule. The findings of the project module 214 may be used to enhance the relevancy of identified candidate topics for serendipitous meetings. For example, if a project manager is within a physical proximity to two or more individuals for which candidate agenda items for a serendipitous meeting are identified, the agenda item pertaining to an individual who occasionally completes tasks late may be given a higher priority than an agenda item pertaining to an individual who usually completes task on time.

In various embodiments, individuals who do not have a preexisting relationship (e.g., as members of a same organization) may be presented with a proposal for a serendipitous meeting. For example, a person who is attending a conference may be notified that another person at the conference has expertise in a particular subject that the person has expressed an interest in. The person may be notified of the presence of the additional person and given an option to request a serendipitous meeting with the other person to discuss the subject. The other person may then be notified of the request by the person and given the option to accept or decline the invitation for the serendipitous meeting.

Figure 7:
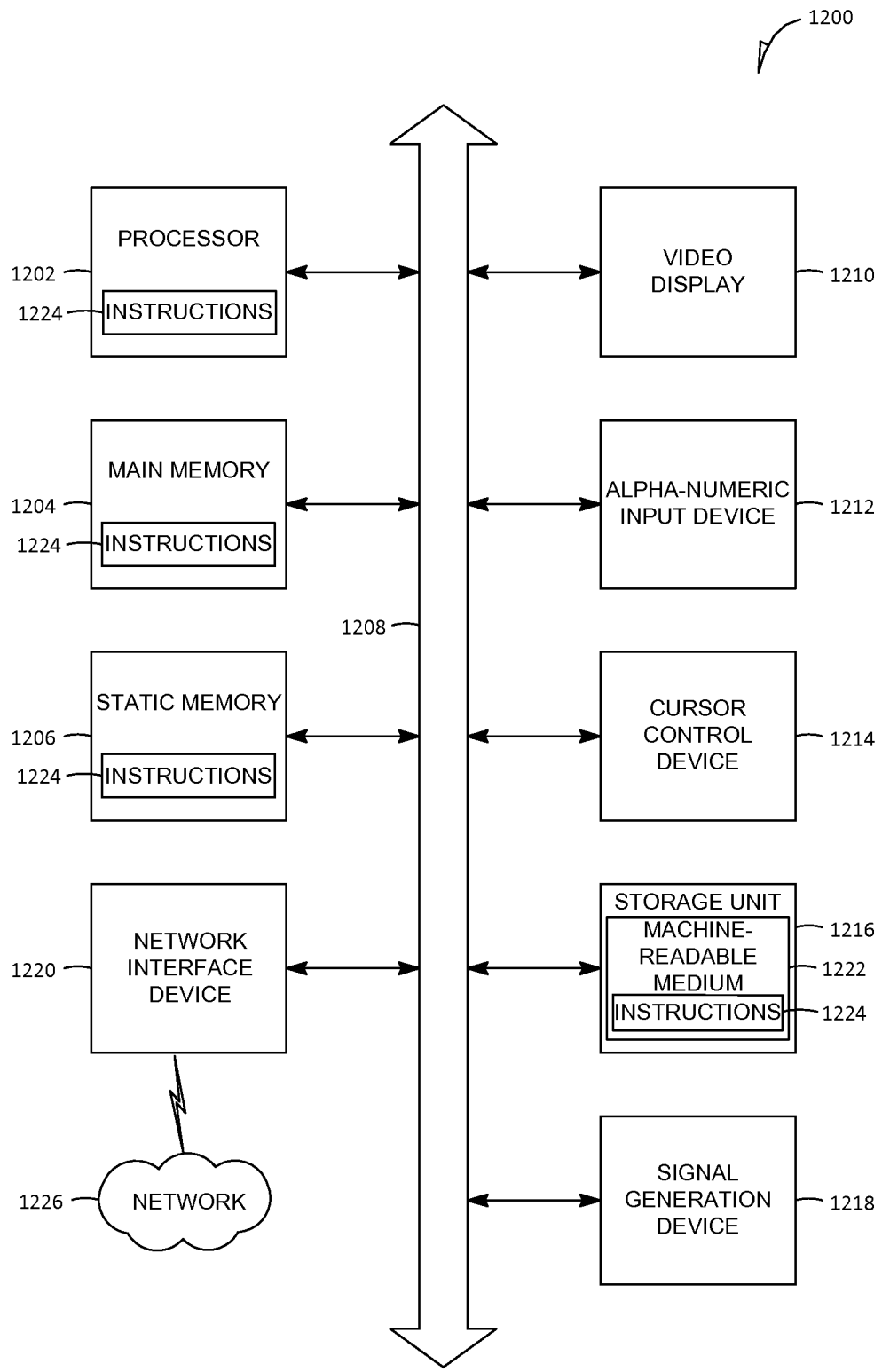
FIG. 7 is a block diagram of a machine in the example form of a computer system within which instructions for causing the machine to perform any one or more of the operations or methodologies discussed herein may be executed.

FIG. 7 is a block diagram of a machine in the example form of a computer system 1200 within which instructions for causing the machine to perform any one or more of the operations or methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a storage unit 1216, a signal generation device 1218 (e.g., a speaker) and a network interface device 1220.

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 1224 may further be transmitted or received over a communications network 1226 using a transmission medium. The network 1226 may be one of the networks 1220. The instructions 1224 may be transmitted using the network interface device 1220 and any one of a number of well-known transfer protocols (e.g., Hyper Text Transfer Protocol (HTTP)). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   determining that a first person of an organization is within a physical proximity to a second person of the organization based on a communication received from a mobile device of the first person and a communication received from a mobile device of the second person;
   identifying a discussion topic from a plurality of discussion topics stored in a database of a networked system based on an aggregate relevancy score associated with the discussion topic transgressing a relevancy threshold, the aggregate relevancy score representing an aggregation of a first relevancy score, a second relevancy score, and a third relevancy score, the first relevancy score representing a relevancy of the discussion topic to the first person, the second relevancy score representing a relevancy of the discussion topic to the second person, and the third relevancy score representing an importance of the discussion topic to the organization, the importance of the discussion topic to the organization based at least in part on completion data pertaining to tasks associated with a project of the organization that is relevant to the discussion topic; and
   notifying at least one of the first person and the second person of the identifying of the discussion topic while the first person is within the physical proximity to the second person, the notifying including sending a communication for presentation in at least one of a user interface of the mobile device of the first person and a user interface of the mobile device of the second person, the communication including information pertaining to the discussion topic, one or more modules incorporated into the networked system to configure one or more processors of the networked system to perform the determining, identifying, and notifying.

2. The method of claim 1, wherein the notifying of the at least one of the first person and the second person of the identifying of the discussion topic includes proposing the discussion topic as an agenda item for an impromptu meeting between the first person and the second person.

3. The method of claim 1, wherein the third relevancy score is based on an importance of a first task to the organization and an importance of a second task to the organization, the first task being associated with the first person and the second task being associated with the second person, the discussion topic relating to the first task and the second task.

4. The method of claim 1, further comprising:
determining that the first person is within the physical proximity to a third person of the organization;
identifying an additional discussion topic based on an additional aggregate relevancy score transgressing an additional relevancy score threshold; and
wherein the notifying of the at least one of the first person and the second person of the identifying of the discussion topic is based on the aggregate relevancy score being greater than the additional aggregate relevancy score.

5. A system comprising:
one or more processors configured to, based on an execution of the one or more instructions included in a memory:
determine that a first person of an organization is within a physical proximity to a second person of the organization;
identify a discussion topic from a plurality of discussion topics stored in a database of a networked system based on an aggregate relevancy score associated with the discussion topic transgressing a relevancy threshold, the aggregate relevancy score representing an aggregation of a first relevancy score, a second relevancy score, and a third relevancy score, the first relevancy score representing a relevancy of the discussion topic to the first person, the second relevancy score representing a relevancy of the discussion topic to the second person, and the third relevancy score representing an importance of the discussion topic to the organization, the importance of the discussion topic to the organization based at least in part on completion data pertaining to tasks associated with a project of the organization that is relevant to the discussion topic; and
notify at least one of the first person and the second person of the identifying of the discussion topic while the first person is within the physical proximity to the second person.

6. The system of claim 5, wherein the notifying of the at least one of the first person and the second person of the identifying of the discussion topic includes proposing the discussion topic as an agenda item for an impromptu meeting between the first person and the second person.

7. The system of claim 5, wherein the third relevancy score is based on an importance of a first task to the organization and an importance of a second task to the organization, the first task being associated with the first person and the second task being associated with the second person, the discussion topic relating to the first task and the second task.

8. The system of claim 5, wherein the one or more processors are further configured to:
determine that the first person is within the physical proximity to a third person of the organization;
identify an additional discussion topic based on an additional aggregate relevancy score transgressing an additional relevancy score threshold; and
wherein the notifying of the at least one of the first person and the second person of the identifying of the discussion topic is based on the aggregate relevancy score being greater than the additional aggregate relevancy score.

9. The method of claim 5, wherein the importance of the discussion topic to the organization is based on a trend of distribution of a number of communications pertaining to the discussion topic between people of the organization.

10. A non-transitory machine readable medium embodying a set of instructions that, when executed by one or more processors, cause the one or more processors to perform operations, the operations comprising:
determining that a first person of an organization is within a physical proximity to a second person of the organization;
identifying a discussion topic from a plurality of discussion topics stored in a database of a networked system based on an aggregate relevancy score associated with the discussion topic transgressing a relevancy threshold, the aggregate relevancy score representing an aggregation of a first relevancy score, a second relevancy score, and a third relevancy score, the first relevancy score representing a relevancy of the discussion topic to the first person, the second relevancy score representing a relevancy of the discussion topic to the second person, and the third relevancy score representing an importance of the discussion topic to the organization, the importance of the discussion topic to the organization based at least in part on completion data pertaining to tasks associated with a project of the organization that is relevant to the discussion topic; and
notifying at least one of the first person and the second person of the identifying of the discussion topic while the first person is within the physical proximity to the second person.

11. The non-transitory machine readable medium of claim 10, wherein the notifying of the at least one of the first person and the second person of the identifying of the discussion topic includes proposing the discussion topic as an agenda item for an impromptu meeting between the first person and the second person.

12. The non-transitory machine readable medium of claim 10, wherein the third relevancy score is based on an importance of a first task to the organization and an importance of a second task to the organization, the first task being associated with the first person and the second task being associated with the second person, the discussion topic relating to the first task and the second task.

13. The non-transitory machine readable medium of claim 10, the operations further comprising:
determining that the first person is within the physical proximity to a third person of the organization;
identifying an additional discussion topic based on an additional aggregate relevancy score transgressing an additional relevancy score threshold; and
wherein the notifying of the at least one of the first person and the second person of the identifying of the discussion topic is based on the aggregate relevancy score being greater than the additional aggregate relevancy score.

14. The method of claim 9, wherein the importance of the discussion topic to the organization is further based on the trend of the distribution of the number of communications indicating a recent increase in the number of communications.

* * * * *